(12) United States Patent
Marshall (10) Patent No.: US 9,465,095 B2
(45) Date of Patent: Oct. 11, 2016

(54) ROBUST LOCATION ESTIMATION

(75) Inventor: Chris Marshall, Haywards Heath (GB)

(73) Assignee: u-blox AG, Thalwil (CH)

( * ) Notice: Subject to any disclaimer, the term of this patent is extended or adjusted under 35 U.S.C. 154(b) by 846 days.

(21) Appl. No.: 13/057,273

(22) PCT Filed: Aug. 5, 2009

(86) PCT No.: PCT/GB2009/050977
§ 371 (c)(1),
(2), (4) Date: Feb. 2, 2011

(87) PCT Pub. No.: WO2010/015854
PCT Pub. Date: Feb. 11, 2010

(65) Prior Publication Data
US 2011/0128183 A1    Jun. 2, 2011

(30) Foreign Application Priority Data

Aug. 6, 2008   (GB) .................................. 0814355.4

(51) Int. Cl.
*G01S 1/08* (2006.01)
*G01S 5/02* (2010.01)
*G01S 19/48* (2010.01)
*H04W 64/00* (2009.01)

(52) U.S. Cl.
CPC .............. *G01S 5/0252* (2013.01); *G01S 19/48* (2013.01); *H04W 64/00* (2013.01); *G01S 5/0263* (2013.01)

(58) Field of Classification Search
CPC ...... G01S 5/252; G01S 19/48; G01S 5/0263; H04W 64/00
USPC ......................................................... 342/386
See application file for complete search history.

(56) References Cited

U.S. PATENT DOCUMENTS

| 1,342,885 A * | 6/1920 | Armstrong ..................... 455/315 |
| 7,221,928 B2 * | 5/2007 | Laird et al. ................ 455/404.1 |
| 7,397,424 B2 | 7/2008 | Houri |

(Continued)

FOREIGN PATENT DOCUMENTS

| WO | WO 2006/110181 A2 | 10/2006 |
| WO | WO2006110181 A2 | 10/2006 |

(Continued)

OTHER PUBLICATIONS

Schilit, Bil N. et al., "Challenge: Ubiquitous Location-Aware Computing and the "Place Lab" Initiative," ACM, New York, NY, Sep. 19, 2003, pp. 29-35.

(Continued)

*Primary Examiner* — Frank J McGue
(74) *Attorney, Agent, or Firm* — Vierra Magen Marcus LLP (57) ABSTRACT

A method of collecting information for supplementing a trusted estimate of position. The method comprises: receiving first information sufficient to derive a trusted estimate of a first position; receiving an indication that a supplementary estimate of a second position in the vicinity of the first position may be required; in response to the indication, sensing information comprising the identity of at least one terrestrial wireless source observable in the vicinity of the first position; and storing the sensed information in association with the first position. The method enables the trusted estimate of the first position to subsequently be used to estimate any said second position from which the at least one wireless source is observable.

11 Claims, 3 Drawing Sheets

(56) References Cited

U.S. PATENT DOCUMENTS

| | | |
|---|---|---|
| 8,804,551 B2 | 8/2014 | Marshall et al. |
| 2004/0176108 A1 | 9/2004 | Misikangas |
| 2005/0031047 A1 | 2/2005 | Maltsev et al. |
| 2006/0019679 A1 | 1/2006 | Rappaport et al. |
| 2006/0217131 A1 | 9/2006 | Alizadeh-Shabdiz et al. |
| 2006/0271517 A1 | 11/2006 | Deloach, Jr. |
| 2007/0049295 A1 | 3/2007 | Soliman et al. |
| 2007/0073937 A1 | 3/2007 | Feinberg et al. |
| 2007/0081496 A1 | 4/2007 | Karge et al. |
| 2007/0182629 A1 | 8/2007 | Angus |
| 2007/0182637 A1 | 8/2007 | Karanik et al. |
| 2008/0218401 A1* | 9/2008 | Loomis et al. ........... 342/66 |
| 2008/0274750 A1 | 11/2008 | Carlson et al. |
| 2011/0143772 A1 | 6/2011 | Sridhara et al. |

FOREIGN PATENT DOCUMENTS

| | | |
|---|---|---|
| WO | WO 2007/056738 A2 | 5/2007 |
| WO | WO 2007/076152 A2 | 7/2007 |
| WO | WO 2009/141642 A1 | 11/2009 |
| WO | WO 2009/141660 A1 | 11/2009 |
| WO | WO 2010/141934 A1 | 12/2010 |

OTHER PUBLICATIONS

Office Action dated 12/17/2013, in Japanese Patent Appl. No. 2011-521644.

Amendment dated Aug. 15, 2013, in Chinese Patent Appl. No. 200980130534.3.

Communication pursuant to Article 94(3) EPC dated Feb. 27, 2012, in European Patent Appl. No. 09785447.5.

Summons to attend oral proceedings pursuant to Rule 115(1) EPC dated Oct. 23, 2012, in European Patent Appl. No. 09785447.5.

Amendment dated Dec. 19, 2012, in European Patent Appl. No. 10196316.3.

Weyn et al., "A WiFi Assisted GPS Positioning Concept", University College of Antwerp, Department of Applied Engineering, Jan. 31, 2008.

Office Action dated Oct. 8, 2012, in Chinese Patent Appl. No. 200980130534.3.

Amendment dated Feb. 20, 2013, in Chinese Patent Appl. No. 200980130534.3.

Office Action dated Jun. 25, 2013, in Chinese Patent Appl. No. 200980130534.3.

Office Action dated Feb. 7, 2013, in U.S. Appl. No. 13/020,736, filed Feb. 3, 2011.

Amendment dated Jun. 28, 2013, in U.S. Appl. No. 13/020,736, filed Feb. 3, 2011.

Amendment dated Oct. 15, 2013, in U.S. Appl. No. 13/020,736, filed Feb. 3, 2011.

Office Action dated Oct. 24, 2013, in U.S. Appl. No. 13/020,736, filed Feb. 3, 2011.

Amendment dated Mar. 24, 2014, in U.S. Appl. No. 13/020,736, filed Feb. 3, 2011.

Notice of Allowance dated Apr. 10, 2014, in U.S. Appl. No. 13/020,736, filed Feb. 3, 2011.

* cited by examiner

ROBUST LOCATION ESTIMATION

This is a non-provisional application claiming the benefit of International application number PCT/GB2009/050977 filed Aug. 5, 2009.

This invention relates to methods for combining location estimates from different sources to improve the robustness of the estimation. It is particularly relevant in the case where one of the location estimates is provided by a satellite positioning system, such as the Global Positioning System (GPS).

GPS is an excellent means for determining location and its use is becoming increasingly widespread in domestic portable products. In theory, its availability is ubiquitous on the earth's surface; however, in built-up areas, there is often a poor view of the sky so that GPS signals cannot always be obtained. Furthermore, reflections from tall buildings can create multi-path interference, introducing errors even when it is apparently possible to calculate a position. Beyond urban areas, being indoors or under foliage also typically impedes reception of GPS signals.

It is known to supplement GPS data with another positioning system data, so that the overall reliability can be improved. Triangulation based on mobile (cellular) telephony base station signals can be employed as a slightly less accurate temporary positioning system to provide additional robustness to the GPS system. Assisted GPS systems of this type were developed primarily for a scenario in which the GPS receiver is integrated in a mobile communications device. The mobile device uses its communications interface (e.g. GSM or GPRS) to access an assistance server, to which it sends measurements of the base station signals. The assistance server maintains a database of base station locations and uses these to triangulate the position of the mobile device, using the received measurements. The location estimate is then sent back to the device. Triangulation and database maintenance are computationally- and memory-intensive tasks, which could not easily be carried out by the mobile device.

It has previously been proposed to provide a location beacon database to function as a positioning system. If the beacons are WiFi (WLAN) access points (APs), such a database contains their MAC addresses, calculated estimated positions of the APs, and possibly their power profiles—that is, what signal strength can be expected at various locations around the AP. The database is usually populated by carrying out so-called "war-drives", gathering at known locations the identities of APs sighted and measurements of the AP signal strengths, and possibly other signal data (e.g. Doppler, error rate). The locations of sightings of APs may be determined by a GPS system.

In order to use deduced locations of the detected APs, a sufficient data sample must have first been gathered to enable the location of each AP to be deduced, before it can be used to assist in location. Thus, small sets of data relating to the detection of AP signals cannot reliably be used. There can also be difficulties of handling disjoint sets of detected signals by means of a model of an AP, although this can readily arise—for example if there are two separate patches of visibility of the AP. Because of the burden of carrying out a "war-drive" exhaustively traversing an area of interest, it is usual for the responsibility for building the database to be shared among contributors, who are typically private individual hobbyists. In these circumstances, there is a heavy bias in the data sample towards the routes and locations most often frequented. This so called "arterial bias", introduces systematic inaccuracies into the deduced AP locations. Worse still, each contributor will have used different hardware to make the necessary signal measurements, without calibration or control, leading to unknown fluctuations in the data.

The database is used when a user requires a position fix. The process of finding a fix is typically as follows, according to the prior art:
(i) scan for observable APs, with their signal strengths and other signal data;
(ii) look up reference data about the location and possibly power profile of these APs in the database; and
(iii) derive the estimated user position.

This approach requires a large amount of data analysis, and either a connection to a central server, or a local copy of the database on the mobile device.

U.S. Pat. No. 7,397,424 discloses a system in which the population of the database and its use are carried out by a single device. That is, a device incorporating a GPS receiver and wireless scanner carries out the "war-drive" function when a GPS signal is available and uses the collected information to perform beacon-based positioning when GPS is unavailable.

According to an aspect of the current invention, there is provided an improved method of collecting information for supplementing a trusted estimate of position, the method comprising: receiving first information sufficient to derive a trusted estimate of a first position; receiving an indication that a supplementary estimate of a second position in the vicinity of the first position may be required; in response to the indication, sensing information comprising the identity of at least one terrestrial wireless source observable in the vicinity of the first position; and storing the sensed information in association with the first position, whereby the trusted estimate of the first position can subsequently be used to estimate any said second position from which the at least one wireless source is observable.

This offers an intelligent method for collecting the beacon-identity data necessary for wireless AP positioning. Essentially, the measurement (sensing) of local wireless sources is adaptively targeted to instances where the information is likely to be useful, rather than relying on uniform, indiscriminate sampling. Observations (or their density) can be targeted intelligently if it is possible to predict when a position derivation is likely to be impeded. This can be achieved by triggering of the observation using certain leading indicators of signal loss. The "indication" that a supplementary estimate of position may be required is therefore a predictor of the likely usefulness of sampling the environment at any particular time and place. Put another way, the indication is a prediction that increased robustness will be desirable in a certain environment. By better focusing of the sensing workload, both power consumption and the number of unnecessary or redundant observations are reduced. This leads to increased battery life when the method is implemented in a portable/handheld device, as it will often be in practice. It also results in a smaller, more efficient database for wireless AP positioning, when needed. Furthermore, because the population of the observation database is influenced in real-time by intelligent indicators, the resulting database will be inherently customized to the needs and usage-pattern of the individual user. As a related advantage, the problem of arterial bias is turned to the user's advantage: any bias in the observations will be toward the places frequented by that particular individual. According to the method, the wireless beacon positioning supplements a trusted estimate of position. The means providing the trusted estimation may vary but will typically be of equal or greater accuracy than the resolution possible with the wireless beacon positioning. Note that it is not essential for the sensing of terrestrial wireless beacons to be carried out at precisely the first position. It is sufficient that each observation can be associated with its corresponding received first information and assumed to correspond to substantially the same location. The assumption underlying the method is that the same set of sensed wireless beacons would be visible at the first position, the second position and the point at which the beacon identities are sensed. The supplementary position estimate provided by the beacon positioning system will be accurate to the extent that this condition is satisfied.

The first information may be satellite positioning signal data.

This is one beneficial example of trusted positioning means. Satellite positioning is both highly accurate and autonomous (requiring no user input), when satellite signals are available. It also complements positioning via terrestrial wireless sources—satellite positioning is less reliable in dense urban environments, but such environments typically exhibit a high density of wireless sources which can be used as beacons. Satellite positioning may be carried out in "real time" in a portable navigation device, wherein satellite data is processed to derive position as it is received. However, the method is equally applicable in a "capture and process later" (hereinafter "capture and process") scenario, in which satellite signals are stored and only later processed to extract position information. In the capture and process case, the first information described above consists of "raw" satellite signal data samples—such as intermediate frequency (IF) data samples. Both this data and the sensed wireless identity (or identities) are stored associated with the first position. The data samples are subsequently processed, to derive the trusted estimate of the first position, which is then available to estimate nearby second positions where a similar set of beacon identities have been sensed.

The first information may alternatively be input manually by a user.

User input is another beneficial source of trusted position information. This input may constitute, for example, geographic coordinates or an address (from which coordinates can be derived).

The indication may comprise at least one of: activation or deactivation of a portable device for receiving a satellite positioning signal; and detected weakening, loss or restoration of reception of a satellite positioning signal.

Turning on or off a portable navigation device (PND) can, in itself, be an indication that the user is at a place of interest or importance. When the primary positioning system is a satellite positioning system, these events will also often be associated with loss of satellite signal: for example, due to being parked in a garage, or walking into a building. A supplementary estimate of position may be required for either reason. Similarly, the weakening of a received satellite signal or its loss indicates that alternative position estimates will be required. Such weakening can be measured in terms of ability to compute a position estimate from the signal, signal-to-noise ratio, level of multipath interference or any other suitable method. Conversely, reception of the satellite signal again after a period of unavailability indicates a useful place to sample the environment, since the user may repeat or reverse the journey in question, and so have need of the wireless observation.

The indication may comprise a movement characteristic of a portable device for receiving a satellite positioning signal.

Movement and movement patterns provide useful predictors of the need for supplementary positioning information. The movement information can be derived from any source—for example, in the case of satellite positioning, movement information is available as a history of position estimates or can be derived from Doppler measurements. The movement indication could alternatively be provided from an independent source, such as an accelerometer or vibration sensor.

The indication may comprise at least one of: detected slow speed of the portable device; detected reducing speed or stopping of the portable device; and detected starting or increasing speed of the portable device;

Starting and stopping can indicate useful waypoints as well as the start and end of a journey. Slow or reducing speed may indicate entry into a dense urban area, in which satellite positioning signals may be degraded. Conversely, increasing speed may indicate departure from a congested area, which may later be re-entered. In each case, sensing of the wireless sources in the vicinity may be prudent, to support supplementary positioning estimates on other occasions.

The method may further comprise, after the initial sensing step in response to the indication, suppressing further sensing steps.

This prevents redundancy in the database and reduces power consumption still further. Once the environment has been sampled once in response to a particular stimulus, it can be wasteful to repeat the same measurements. For example, when a satellite positioning signal is lost or signal strength drops, one sample of the environment is indicated, but repeated observations are both redundant and likely to be increasingly unrelated to the last successful trusted position estimate with which they are associated. Likewise, if the trigger for an observation is slow movement or stopping of a portable device, additional samples are of lesser value, since the same set of wireless identities will likely be duplicated.

The indication may comprise an application event.

Application events, such as the taking of a photograph may indicate significant locations which may be visited again and in which a reliable and complete position estimate is important. Triggering a wireless beacon sample in these circumstances ensures full coverage of the places that are important to the user. In greater detail, this means that the wireless environment is sampled when the photograph is taken and this observation is stored in association with the first position. This stored information can support later estimation of position using wireless observations alone—for example, if further photos are taken in the area but a trusted (e.g. GPS) estimate of position is no longer available.

The sensed information may comprise additional information about the environment at the first position.

The observations may extend beyond simply recording the identity of local beacons, to include signal parameter measurements such as received signal power, direction of arrival or SNR.

According to another aspect of the invention, there is provided a portable navigation device adapted to perform all the steps of any of claims 1 to 10, the device comprising: receiver apparatus, for receiving first information sufficient to derive a trusted estimate of a first position; receiver apparatus, for receiving an indication that a supplementary estimate of a second position in the vicinity of the first position may be required; sensing apparatus, for sensing information comprising the identity of at least one terrestrial wireless source observable in the vicinity of the first position; and a memory, for storing the sensed information in association with the first position.

The invention will now be described by way of example with reference to the accompanying drawings, in which.

Prior art methods combining GPS and beacon-based positioning have relied on the concept of a dedicated "wardrive" in which an individual travels around an area of interest, collecting observations of all the visible WiFi access points and correlating them with measured GPS position. The current inventors have recognised that, while this approach works well for populating a large, shared database and for explicitly estimating AP locations, it is not appropriate for a single independent user. On the contrary, for a portable device which needs to dynamically switch between position estimation by GPS and WiFi (when GPS is unavailable), it is much better to target the gathering of WiFi AP data intelligently. That is, WiFi observations are only taken when they are likely to be of use later on. This saves power and memory consumption due to the elimination of redundant and unnecessary AP observations and also customizes the database to the usage patterns and activities of the given user. With regular periodic sampling regimes, the only way to reduce power consumption is to decrease the frequency of the samples; but this decreases the overall accuracy and robustness of the positioning system. In the current system, the quality of position estimates from adaptively triggered observations will therefore be higher that than from sparsely sampled regular observations.

The inventors have also recognised that there are a number of relevant cues readily available to a typical PND, which indicate when it might be useful to add an AP observation to the database.

Figure 1:
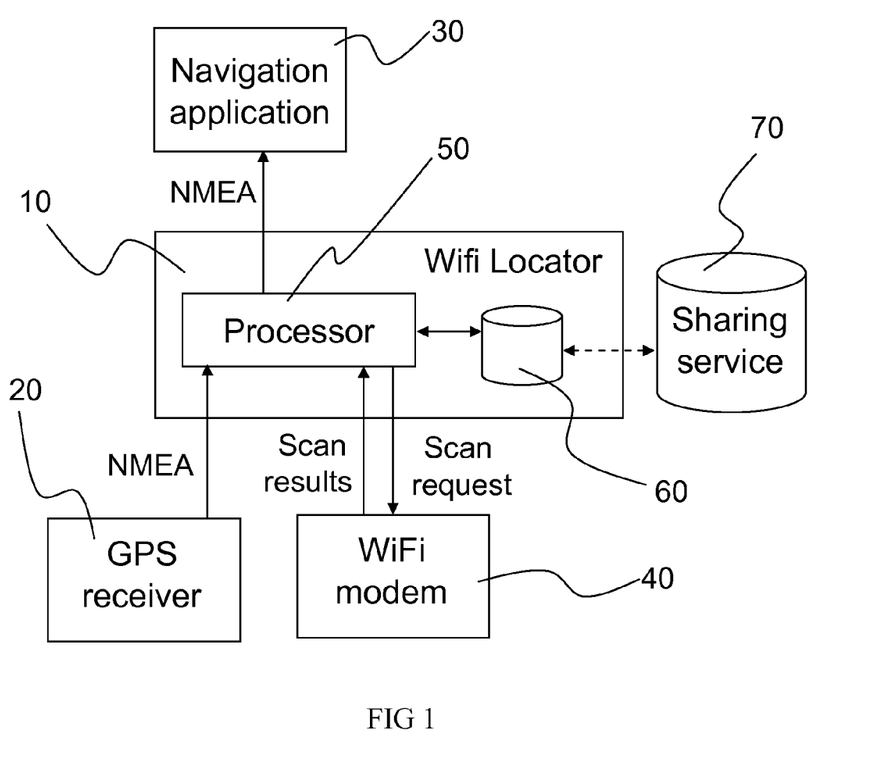
FIG. 1 is a block diagram of a device according to an embodiment of the invention.

FIG. 1 shows a system for robust position estimation according to an embodiment. For the sake of clarity of exposition, the system will be described with the assumption that it relates to real-time GPS positioning; however, this does not exclude the possibility of implementing the system as a capture and process system.

The system includes a WiFi locator device 10, which is intended to augment an existing GPS receiver 20 and navigation application 30. That is, in a conventional configuration, GPS receiver 20 would be connected directly to the navigation application 30. In the example, the communication between these two is via a NMEA (National Marine Electronics Association—NMEA 0183) interface. The WiFi locator 10 is designed to receive input from the GPS receiver 20 and output enhanced position data to the navigation application 10 via the existing NMEA interfaces of those respective devices.

A WiFi modem 40 is also connected to the WiFi locator 10. The modem 40 can communicate with WiFi (WLAN) access points in the vicinity of the device. In particular, it can interrogate (either passively or actively) the APs to determine the identity (typically given by a MAC address) of each. Since each individual MAC address is unique, the set of APs visible at any given instant can be used to infer the location of the WiFi Locator device. The accuracy of this inference is fundamentally governed by the transmitter range of each AP as well as by the physical layout of the set of APs. However, the inference also depends on the availability of information cross-referencing or associating the AP identities with position. This information is collected by the device in a dynamic manner.

The WiFi locator 10 includes a processor 50 and a memory 60. The processor receives data from both the WiFi modem 40 and the GPS receiver 20. In this example, which uses a real-time GPS implementation, the data received from the GPS receiver 20 consists of position information, such as geographic coordinates. It may also include additional information, such as the status of the GPS receiver 20 and the predicted error in the position estimates being provided. The position information provided by the GPS receiver comprises a primary, trusted position estimate. The GPS position will be used as a reference from which other estimates can be inferred (using WiFi positioning).

The processor receives observations of WiFi APs from the WiFi modem 40. These consist of a list of MAC addresses of nearby wireless APs detected by the modem 40. The modem 40 may produce this list by an active or a passive scan. In an active scan, the APs are interrogated with a query by the modem 40. In a passive scan, the modem simply records broadcast AP identity information. Scans are initiated (requested) explicitly by the processor 50 in the WiFi Locator 10. By waiting until scans are explicitly triggered by the processor 50, rather than executing continual regular scans, the WiFi modem 40 saves power. The capacity of the memory 60 is also used more efficiently, since the triggered scans are chosen intelligently to correspond to the situations in which they are most useful to an individual user. That is, the scans are requested by the processor 50 in response to an indication that a WiFi position estimate is likely to be required subsequently. This indication can be derived from several sources, as will be described in greater detail below.

The processor 50 stores the received position information and observations in the memory 60. The memory may comprise a simple buffer which stores as little as just one previous observation and position. Alternatively, it may store a longer history of recorded positions and observations.

The processor 50 uses the stored history of GPS position estimates and WiFi AP observations to enhance the location estimates provided to the navigation application 30. By basing the estimates on the combined GPS and WiFi information, the WiFi locator 10 can offer more robust and/or faster position information than is available by using either alone. For example, if the GPS receiver 20 fails to provide a position estimate, but the WiFi modem nonetheless provides an observation, the processor can compare the current observation with a stored observation. If the comparison shows that a similar set of APs is visible, then the processor 50 provides the stored position information (corresponding to the stored AP observation) to the navigation application 30 as a location estimate.

Optionally, the content of the memory can be uploaded to a sharing service 70. This allows other devices or users to utilise the set of positions and observations collected by the device. This will be particularly beneficial where multiple devices are owned by the same user—the information stored by each device will be equally relevant to that user and can be used by each device as if collected by that device. If the information is shared among users, the individual relevance of the data may be reduced; however, it may be better to have the shared data of another user rather than none at all—for example when visiting a new location for the first time, before personally collected data are available in the database. Another possibility for users who own multiple location-aware devices will be to link all the devices to a single WiFi locator. That is, multiple navigation applications 30 can be enabled by a common WiFi locator 10.

Figure 2:
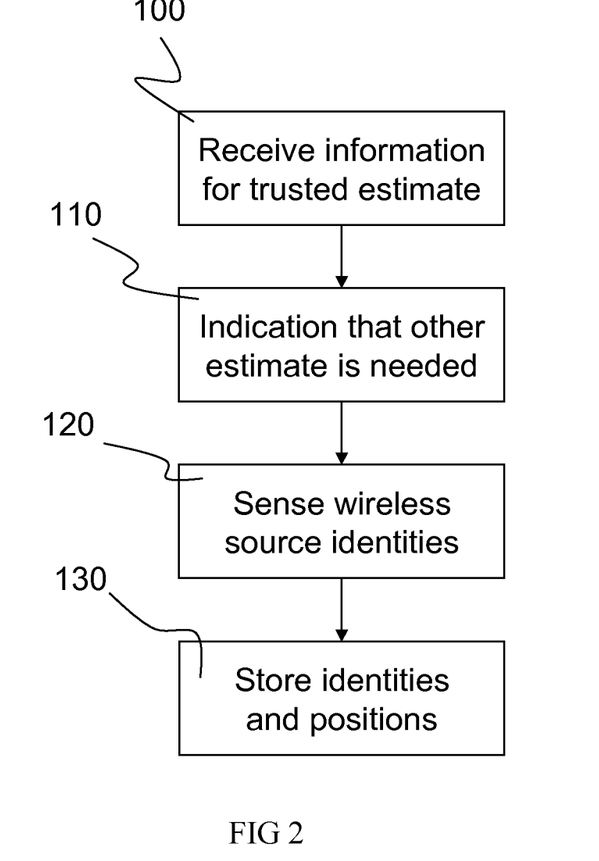
FIG. 2 is a flowchart showing a method of collecting information according to an embodiment of the invention.

FIG. 2 shows a flowchart of a method according to a first embodiment of the invention. As before, this will be described in terms of a real-time GPS implementation. At step 100, trusted (that is, GPS) signal data A is obtained. The signal data comprises signals received from GPS satellites and is sufficient to enable a position to be calculated. The satellite signal data is received at a location A.

At step 110, an indication is received that a secondary position estimate is likely to be required in the vicinity of location A. This requirement could arise for various reasons: for example, because GPS signals are expected not to be available and/or because this location is of particular significance to the user.

The indication can likewise be inferred from a number of sources. One useful indicator of the value of observations is the quality or possibility of the satellite position measurement itself. Thus, in one example, the indication might be a direct measurement of fading GPS reception, indicating that it will soon become impossible to compute a position fix. For example, when a position measurement via a GPS fix is no longer possible, the user is assumed to have moved from a good signal environment to a poor signal environment (for example walking through a doorway indoors). A sample observation of the sensed AP identities will give information about the environment in the vicinity of the doorway. Likewise, observations may be useful when the quality of the GPS fix is poor. In this case the user is in a marginal condition and it is likely that the environment will worsen—all gathered information could therefore be helpful at this stage. On the other hand, observations can also be triggered when a GPS fix becomes possible after a period of unavailability. This could be a useful boundary case to store, in case the user reverses their path, or indeed does the journey again another time. Previous knowledge about the environment in that event would assist in the prediction of the likely fix measurement.

In another case, the indication might be inferred from the activation or deactivation of the PND itself. A stage in the power down procedure of the PND (or its location function) could sample the signal environment, in order to recognise the environment and therefore likely location upon subsequent reactivation. For the same reasons, a sample can be triggered when switching on the device or location function.

Detected movement patterns of the PND can also provide a valuable source of information. Movement can be detected as a result of measurements of position fix by GPS or by other means (for example, by an accelerometer). In one example approach, an observation may be sampled if the device is believed to have stopped moving. This is to gather a spot sample of the environment, in anticipation of possible movement into a difficult (for example, indoor) environment nearby. While the device remains stationary, further samples may be only taken at longer intervals (rather than continuously, or frequently), in case the environment changes. Sample observations may also be taken if the device is moving slowly, for example at walking speed. In this case, again, it is reasonable to expect that the user is likely to move into a difficult (indoor) environment, or is manoeuvring into a car park or garage. The frequency of samples may be reduced if travelling at high speed; under these conditions GPS visibility is likely to be good, and further information about the environment is not necessary. Starting (accelerating) from a stationary position is a useful indicator for the inverse reason: the user may just have emerged from an environment with little or no GPS reception. The common factor to each of these indicators is that they flag "boundary" cases—situations in which GPS reception may become unreliable, either shortly afterward or on a future journey.

Other indicators will imply that the current location is one of particular significance to the user. Certain application-activities will be location-dependent and may also indicate that an event of interest has occurred. Taking a photograph is a good example of this and would indicate that the user is interested in the immediate surroundings. Equally, a specific user request can be the trigger. The user could request an observation manually to mark a way-point on a trip, a favourite restaurant or some other landmark. Such a manual sample allows the environment to be associated arbitrary user events of interest.

At step 120, in response to the indication, an observation of nearby WiFi beacons (APs) is obtained. It is not essential that this observation is carried out at the precise time or location of the reception of the satellite signal data; however, the reception and observation must be close enough together that there is a reasonably high confidence that the observed WiFi identities are the same as those that are observable from the actual location of reception of the satellite signals (location A). In practice, this will mean that—if the observation of WiFi beacons and reception of satellite signals is not synchronised—the latter occurs sufficiently frequently that it is still possible to establish a meaningful correspondence. This may depend on the expected dynamics of the user device. If the application is vehicle positioning, reception of GPS signals may need to be relatively frequent, compared to a pedestrian application, in order to work at the higher speeds involved. Of course, even with careful design, the nature of the method is such that there will be occasions when a GPS fix is impossible at the location where the indication is received. Indeed, this is very likely if there has been a delay between receipt 100 of the GPS signals and receipt 110 of the trigger indication. Nonetheless, it will be useful to record an observation and associate it with the (temporally) closest GPS fix, on the basis that some reference information may prove better than none at all.

The result of the observation is a set of AP identities. At step 130, the set of identities is stored in the memory 60, associated with the position of the corresponding GPS fix (location A). The accumulated data in the memory comprises a database, which can be used to support subsequent position estimation based on wireless AP visibility. That is, when the GPS signal is not available, the PND can once again sense the wireless environment and this time compare the observed APs with the entries in the accumulated database. Similarity between the new observation and one stored in the database (in terms of commonality between the sets of visible APs) implies that the user is at or near the previously visited location.

Note that in the capture and process case, the explicit position fix may not be available at the time the observation is entered (stored) in the database. In this case, the set of AP identities may be associated with the position by means of a label (such as: "unknown1"). The IF signal data samples can then be stored associated with the same label, such that when they are later processed to extract explicit geographic coordinates, those coordinates can be associated with the corresponding stored observation.

Figure 3:
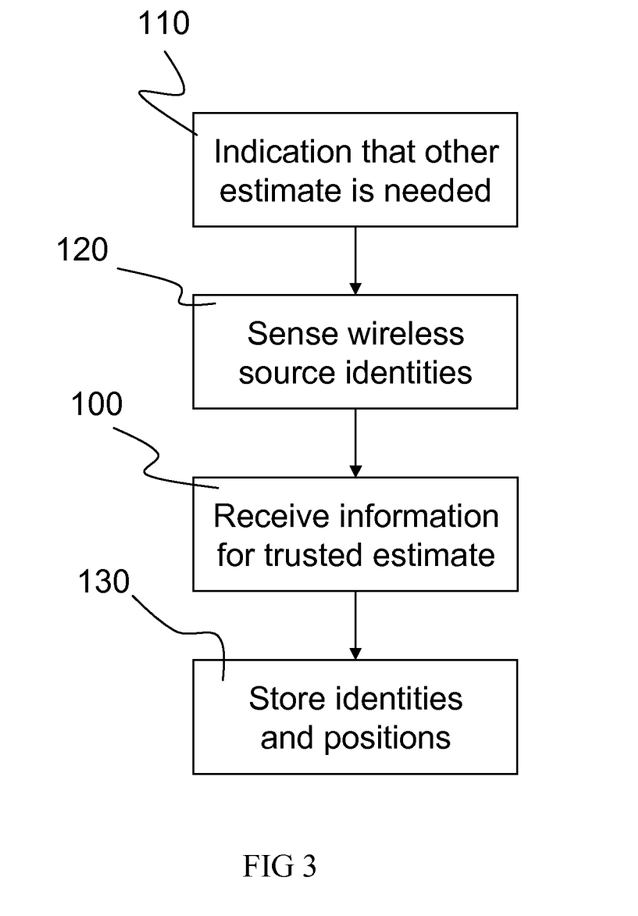
FIG. 3 is a flowchart showing a method of collecting information according to another embodiment.

In a method according to a second embodiment, the steps of the method described above are re-ordered. This is illustrated in FIG. 3 and represents the case where an observation is associated with a trusted position estimate acquired after the observation, rather than before. Thus, in FIG. 3, the first step 110 is the receipt of the indication to sense the wireless environment and store an observation in the database. At step 120 the sensing is executed, in response to the indication. Afterward, at step 100, the associated first information for the trusted (reference) estimate of position is obtained. As in the first exemplary embodiment, above, the final step 130 consists of storing the observation result associated with the trusted position information. This sequence of steps is appropriate to the circumstances at the start of a journey, for example, before a first GPS fix has been achieved.

As will be readily apparent to the skilled person, other variations on the ordering of steps in the method are possible. One constraint in this regard is that the step 120 of sensing the wireless AP identities is carried out in response to (and therefore after) the receipt of the indication to do so. Another obvious practical constraint is that the storage of the observation (identities) cannot take place until after they have been sensed.

As noted above, GPS positioning is just one example of the kind of trusted estimate from which the AP position database may be constructed. However, any available source of position information can be a valid trusted estimate. Indeed, estimated positions based solely on WiFi AP sightings (that is, position estimates exploiting previously stored observations) may be used, if no more reliable information is available. This will, in effect, result in a "chain" of estimates, with "trusted" reference positions calculated from former estimates—which will invariably lead to reduced accuracy, the longer the chain. However, it may allow observation data to be created and associated with positions which are otherwise impossible to determine. This increases the coverage of the database. In many cases, this will be acceptable and certainly preferable to a complete inability to estimate a location. For example, a user may arrive after a car journey at his destination and go inside a building. The PND senses wireless access point X just as it loses a GPS fix. Later, the user moves deeper into the building, where the PND observes AP-Y in addition to AP-X. The device is able to estimate its location as being that where AP-X was first seen and uses the last successful GPS fix (from the car-park) to derive this estimate. The observation of X+Y is stored associated with this estimate. Later still, sight of AP-X is lost but AP-Y is remains visible. Although there was never a true position fix (that is, GPS position) associated with AP-Y, the device can use the stored previous location estimate (derived when AP-Y and AP-X were both visible) as the basis for a secondary estimate. The accuracy of the estimate may be less than for the primary estimate (that is, the estimate directly associated with the GPS fix in the car park) but still places the user at the same street address. Thus, overall spatial coverage is increased.

One advantageous alternative source of trusted position information is the use of manually input location as the trusted position data. Such manual input can take a variety of forms. For example a user could enter an address or postcode; this can then be used, together with a geographic information systems (GIS) database, to derive position coordinates. The user could also indicate their position graphically on a map—in its simplest form this might involve confirming to the PND that the position has not changed from the last available position fix. Although requiring user input is usually avoided, to minimise the burden on the user, in many situations where GPS is unavailable, it will cause little inconvenience to enter a postcode, or click on a map—for example, when parked in a car-park or pausing inside a building before leaving on a journey. When manual input of location occurs, this can itself be taken as an indication to sense wireless AP information, since the location is very likely to be outside GPS coverage and is also clearly of interest to the user. Thus, an observation should be stored associated with the manually input location at this time.

Optionally, the triggering of an observation (and its entry into the database of samples) may be followed by suppression of further observations. This additional step recognises that redundancy may be reintroduced if repeated samples of the environment are sensed in response to the same stimulus (that is, the trigger-indication). For example, once one observation has been made, it will be of limited value to take another WiFi sighting if the device is known to be stationary.

The methods described above can be used to advantage in the following example scenario:

A user switches on his personal navigation device (PND) at his home. The system samples the environment (in response to activation), making observations of nearby wireless APs, and starts up the GPS receiver. The user drives to a new destination (the system navigating on GPS). He arrives successfully and parks. The system samples the environment again (in response to having stopped), before the user turns the PND off. A further sample might be triggered by the power-off command, or this extra sample may be suppressed since a separate observation has already been taken very recently.

At the end of the appointment it is raining. The user turns on his PND indoors to find a route home. No GPS signal is available. The PND recognises the environment from a further AP observation—it is still the same as when it was last turned off—and so places him where he parked. He plans his journey to stop at a café down the road, goes to the car, and sets off. The GPS acquires the signals, and helps him complete his journey to the café. He goes inside, where the system picks up the new WiFi signals of another AP (the observation having been triggered as the GPS signal faded). His position is still shown on the PND—although the GPS signal has been lost, the system is now using the WiFi signals just found. Over a coffee, he works out his route home, and then drives home, turning off the PND once he is safely on the motorway.

The next day he again gets in the car at home in his garage, ready to go to his next appointment. He switches on his PND. The system samples the environment to determine position since no GPS fix is yet available, recognises the home location (and not where he previously finished, on the motorway), and provides the coordinates to the navigation system, immediately ready to plan the day's route.

This example scenario demonstrates the advantages of the current methods. The user has collected a small but highly relevant quantity of data relating AP observations with known positions. This can then be used to augment the GPS positioning system when conditions make it necessary. Since the stored information is related to the activity of the user, the information quality is higher than for a generically-surveyed database. Furthermore, all information is up-to-date (that is, current) and usable immediately. Observations are collected when they are most valuable or most likely to be needed. Moreover, such intelligent sampling can also eliminate or at least reduce the number of unnecessary observations—reducing power consumption and helping to prolong battery life.

As highlighted above, the invention is characterised by its lack of reliance on a previously populated or shared database. However, it is nonetheless possible to upload stored data to such a shared database for the benefit of other users.

Data may also be downloaded from such a sharing service to augment the observations made by an individual PND itself. It may however be advantageous to use the individually collected data in preference to generic shared data, since the observations collected by the user's own device are likely to be more relevant to their usual navigation needs and habitual movements. In essence, the self-obtained data is personalised to a given user. When data are uploaded to a sharing service, the data may be labelled as corresponding to that user, both to protect privacy and to allow that data to later be prioritised (when re-used by the submitting user) over other data (submitted by strangers).

The preceding examples have all focused on the real-time GPS applications of the invention. However, as already noted, the ideas are equally relevant in a capture-and-process scenario. For completeness, the alterations to the device of FIG. 1 to equip it for the capture and process scenario will now be described. In the capture and process regime, the WiFi locator 10 of FIG. 1 becomes an intelligent logger. This device is operable to receive and store signal samples of the GPS satellite broadcasts. It is also samples and stores observations of WiFi nodes nearby, in response to triggered scan requests. The logged data can then be provided to another device (including, but not limited to, a personal computer) for processing. The GPS receiver 20 comprises a GPS Radio Frequency (RF) front-end. This performs the functions of filtering, down-mixing to intermediate frequency (IF) and sampling (analogue to digital conversion) necessary to capture a digital representation of the raw satellite signals. This simplified GPS receiver will not necessarily communicate using the NMEA interface. Indeed, it is more likely to be integrated in the WiFi locator device 10. The WiFi modem 40 senses/interrogates the nearby access points to determine at least their identities, as before. The observations and IF data samples are stored in a memory 60, for later processing. The IF data and observations may be directly associated with one another, or may simply be stored with time-stamps to enable correspondence to be determined later. At the appropriate time, the stored information is transmitted to the device responsible for completing the processing (in the example of FIG. 1, the navigation application 30). As an alternative, the offline processing may be carried out in the logger/locator 10, but at a convenient time—for example, processing only when logging has stopped, to normalise the power consumption of the device over time. In any case, the processing carried out is the same as that described above in the context of the real-time embodiments. One further advantage is that a capture-and-process system is not limited to making causal inferences. That is, the observation and signal data or position information which forms the basis for a location estimate can come from any point in time—both prior and subsequent to the event/observation of interest.

Many variations are possible in particular implementations of the embodiments described above. For example, the observations may involve more detailed sampling of the environment than simply recording the identities of local wireless APs. Other parameters, such as signal strength, direction of arrival and time delay could all be measured. Information relating to movement can also be useful—for example, velocity and time or distance and direction information can be combined in dead-reckoning navigation. This allows a (successful) position estimate to be projected into the future (or past). In the current context, this could be used to more precisely estimate the position at which a WiFi observation has been made (in the case where these are not synchronised with GPS signal data collection)—signal data captured at a point nearest in time to the that of the triggered observation can provide a starting point which can be projected forwards or backwards, as necessary, using movement data to accurately estimate the position at the time of the observation.

Naturally, the scope of the invention is not limited exclusively to wireless LAN (WiFi) APs. Other terrestrial radio transmitters could fulfil the same function. For example, analogue and digital broadcast radio and television transmissions can be observed, as can signals from cellular (mobile) telephony base stations. In each case, the identity of the transmitters can be used to infer connections between observations at different times and places. It is not an absolute requirement that the beacons be fixed terrestrial transmitters (although processing and inference is likely to be more straightforward if they are). For example, Bluetooth radio devices could be the observed wireless sources. Although many Bluetooth devices are portable, inferences will still be possible to a more limited extent. For example, one set of Bluetooth mobile devices may consistently be observed in the home environment and a second separate set may consistently be observed in the work environment. With longer historical storage of measurements and more advanced algorithms it will be possible to deduce with increasing certainty which sources are the most reliable or specific indicators.

As noted above, the embodiments of the invention rely on methods of computing similarity or "overlap" between different observations of wireless sources to establish associations and deduce the reference positions for estimating locations. Among these methods, more advanced approaches to estimating reference positions, in which multiple observations of wireless sources are combined to arrive at a position estimate will tend to be more accurate. Some indicative examples are as follows:

(i) Find an average position from all stored positions where all the currently observed signals have been recorded before. That is, to estimate the current location, retrieve from memory multiple observations identical to the current observation; then, combine the position information associated with those multiple observations by a simple spatial average, to estimate current location.

(ii) Choose the strongest sensed signal (of a wireless source) currently observed which is also stored in the local database (that is, in memory); then, estimate the location as wherever the database reports the strongest instance of this sensed signal to have been observed. This predicts based on a single pair of observation and position estimate; however, this pair is chosen intelligently, based on relative signal strengths. There are two underlying assumptions—firstly, that the strongest observed signal corresponds to the nearest source and secondly, that the strongest recorded instance of that signal corresponds most accurately to the position of the source.

(iii) The local database (memory) can be searched to find the location corresponding to the most recent sample where an identical or similar environment (that is, set of sensed sources) has been observed. This approach works on the assumption that more recent information is more relevant than older observations.

The "similarity" of two sets of sensed sources could involve analysis of the size (strictly, the cardinality) of the intersection of the sets as compared to that of the set difference or symmetric difference. That is, a match is sought which has a large number of sources in common with the current observation and few extra or missing sources.

There are a wide variety of possible ways to define the similarity, using set theory, which will be readily apparent to the skilled person.

Optionally, moving signal sources (such as WiFi nodes on trains) may be detected and taken into account. For example, sensed signals likely to be associated with a moving feature may be identified by detecting their appearance in many different "locations"; by detecting a high level of Doppler effect on some sensed signals; or by having the base-station announce that it is installed on a moving platform. Such signals may either be ignored for finding a stationary location or used to consider the hypothesis that the user is moving together with the signal source.

Note that, although the current invention has been described with reference to GPS satellite positioning, it is equally applicable to other Global Navigation Satellite Systems (GNSS) such as Galileo and GLONASS.

Various other modifications will be apparent to persons skilled in the art.

The invention claimed is:

1. A method performed by a processor of a receiving apparatus of collecting information for supplementing a trusted estimate of position, the method comprising:
   receiving, at the receiving apparatus, first information sufficient to derive a trusted estimate of a first position;
   receiving, at the receiving apparatus, an indication that a supplementary estimate of a second position in the vicinity of the first position may be required because a trusted estimate of the second position will be unreliable or unavailable;
   in response to the indication, sensing information comprising the identity of at least one terrestrial wireless source observable in the vicinity of the first position; and
   storing the sensed information in association with the first position, whereby the trusted estimate of the first position can subsequently be used to estimate any said second position from which the at least one wireless source is observable.

2. The method of claim 1, wherein the first information comprises satellite positioning signal data.

3. The method of claim 2, wherein the satellite positioning signal data comprises data samples of an intermediate frequency signal.

4. The method of claim 1, wherein the first information is input manually by a user.

5. The method of claim 1, wherein the indication comprises at least one of:
   activation or deactivation of a portable device for receiving a satellite positioning signal or activation or deactivation of a location function of such a portable device; and
   detected weakening, loss or restoration of reception of a satellite positioning signal.

6. The method of claim 1, wherein the indication comprises a movement characteristic of a portable device for receiving a satellite positioning signal.

7. The method of claim 6, wherein the indication comprises at least one of:
   detected slow speed of the portable device;
   detected reducing speed or stopping of the portable device; and
   detected starting or increasing speed of the portable device.

8. The method of claim 1, further comprising, after the initial sensing step in response to the indication, suppressing further sensing steps.

9. The method of claim 1, wherein the sensed information comprises additional information about the environment at the first position.

10. A computer program comprising computer program code embodied on a non-transitory a computer readable medium adapted to control a physical computing device to perform all the steps of claim 1 if said program is run on a computer.

11. A portable navigation device adapted to perform all the steps of claim 1, the device comprising:
    sensing apparatus, for sensing information in response to the indication, comprising the identity of at least one terrestrial wireless source observable in the vicinity of the first position; and
    a memory, for storing the sensed information in association with the first position.

* * * * *